(12) United States Patent
Makino

(10) Patent No.: US 6,739,365 B1
(45) Date of Patent: May 25, 2004

(54) TUBELESS TIRE

(75) Inventor: Satoshi Makino, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 172 days.

(21) Appl. No.: 09/926,137

(22) PCT Filed: Oct. 23, 2000

(86) PCT No.: PCT/JP00/07375

§ 371 (c)(1),
(2), (4) Date: Sep. 7, 2001

(87) PCT Pub. No.: WO01/54930

PCT Pub. Date: Aug. 2, 2001

(30) Foreign Application Priority Data

Jan. 27, 2000 (JP) ......... 2000-018572

(51) Int. Cl.⁷ ............ B60C 5/12; B60C 5/14; B60C 9/00
(52) U.S. Cl. ......... 152/510; 152/165; 152/195; 152/196; 152/170
(58) Field of Search ............ 152/165, 170, 152/195, 196, 203, 204, 205, 510

(56) References Cited

U.S. PATENT DOCUMENTS 1,279,001 A * 9/1918 Rawdon ............ 152/195
1,298,661 A * 4/1919 Case ............ 152/339.1
3,930,528 A * 1/1976 Harrington ............ 152/521
4,966,213 A * 10/1990 Kawaguchi et al. ............ 152/504
5,795,414 A 8/1998 Shih

FOREIGN PATENT DOCUMENTS

| JP | 51-132509 | 11/1976 |
| JP | 57-44503 | 3/1982 |
| JP | 61-146608 | 7/1986 |
| WO | WO 99/47345 | * 9/1999 |

* cited by examiner

Primary Examiner—Jeff H. Aftergut
Assistant Examiner—Justin Fischer
(74) Attorney, Agent, or Firm—Arent Fox Kintner Plotkin & Kahn, PPLC (57) ABSTRACT

A tubeless tire (1) comprising:
Twin bead portions (5), each of which lets a wheel engage it;
An outer layer portion (2) having a tread portion (6) to be grounding;
An inner liner layer (3) included rubber, which is entirely stuck inside of the outer layer portion (2), wherein
There is provided the most inner layer (4) inside of the inner liner layer (3), which not only maintains airtight of the tubeless tire, but includes an adhesion part (4a), in which it is stuck to the inner liner layer (3), and non-adhesion part (4b), in which it is not stuck on the inner liner layer (3) and it (4b) can be transformed independently for the outer layer portion (2) and the inner liner layer (3).

5 Claims, 6 Drawing Sheets

TUBELESS TIRE

BACKGROUND OF THE INVENTION

1. Field of the Invention

The present invention relates to a structure of a tubeless tire, which can prevent the air inside the tire from leaking out, even if suffering from external injuries by harmful material such as a nail or the like during running of a vehicle

2. Prior Art

Today, as for a tire of vehicle, there is a tubeless tire widely used currently, for which there is not a tube utilized. The tubeless tire keeps airtight of a tire by making a rubber layer inside of the tire, so called an inner-liner layer.

When a foreign matter such as a long nail or the like stuck in this tubeless tire during running of a vehicle and penetrated the inner-liner layer, air in the tubeless tire has leaked through this penetration part, there might have been a event that running of a vehicle has become inability For such an air leak, it is coped with by that seal materials included a tackiness rubber are put on the inside of the inner liner layer beforehand or that a rubber having viscoelasticity is stuck on the entire surface thereof. For example, when the seal materials are put on the inside of the inner liner layer in advance, the penetration portion will be filled up by self sealing action of seal materials and it can prevent a pneumatic large effluence in a tubeless tire.

However, in order to get the self sealing action of seal materials, it is necessary for seal materials to be put on the inside of the inner liner layer thick so that a weight of the tubeless tire increases. And due to a load transformation of a tire in running, a temperature of the seal materials itself rises, so that there may be a trouble that the seal materials have fluidity. When the seal materials have fluidity, the seal materials come to change their shape in the tubeless tire by rotational oscillation and a weight balance of the tubeless tire collapses, so that vibration of a vehicle is coming brought out.

The present invention has been made the forgoing problems to be solved. It is the primary object of the present invention to provide a tubeless tire, which can prevent abrupt air leak from the same, even if suffering from external injuries by harmful material such as a nail or the like during running of a vehicle.

SUMARY OF THE INVENTION

As for the present invention, there is a constitution provided, in which a tubeless tire comprising: twin bead portions, each of which lets a wheel engage it; an outer layer portion having a tread portion to be grounding; an inner liner layer included rubber, which is entirely stuck inside of said outer layer portion, wherein there is provided the most inner layer in inside of the inner liner layer, which not only keeps airtight of the tubeless tire, but also includes both an adhesion part, in which it is stuck to the inner liner layer, and non-adhesion part, in which it is not stuck on the inner liner layer and it can be transformed independently from the outer layer portion and the inner liner layer.

By the constructed in this way, as the most inner layer does not slip on the inner liner layer by virtue of the adhesion parts in usual traveling, it is possible to drive smoothly. Besides, even if the nails stick to the tubeless tire and penetrate the outer layer portion and the inner liner layer, as the stress that the most inner layer receives from the nails is absorbed by transformation of the non-adhesion part of the most inner layer, the nails can be provided from penetrating the most inner layer portion. And it is able to prevent the tubeless tire from leaking the air thereof.

Besides, according to the present invention, there is provided a constitution that the adhesion part includes another adhesion parts, in which the non-adhesion part that is not stuck to the inner liner layer is glued thereto, and formed in shape of lines or of dots, so that a gap of the most inner layer and the inner liner layer can be surely prevented from occurring in running of the tubeless tire, and when nails stick therein, the most inner layer is surely transformed.

Furthermore, there is a constitution provided, in which the most inner layer has a pleat. Accordingly, it can be transformed bigger, so that even if big stress is added to the most inner layer from the outside, it can be absorbed thereby.

Moreover, there is a constitute provided, in which there is an air or a pneumatic layer formed between the most inner layer and the inner liner layer, in which there is provided a fixed distance between the same layers at one point at least of the non adhesion part. In addition, in case of adopting a constitution that there are formed openings at regular interval in the non-adhesion part of the most inner layer, a difference of air pressures of chambers that are located front or rear of the most inner layer is effectively reduced.

BRIEF DESCRIPTION OF THE DRAWINGS

FIGS. 3(a) and (b) is respectively one part of enlarged view showing the adhesion part of the most inner layer.

DESCRIPTION OF THE PREFERRED EMBODIMENT

First Embodiment

Figure 1:
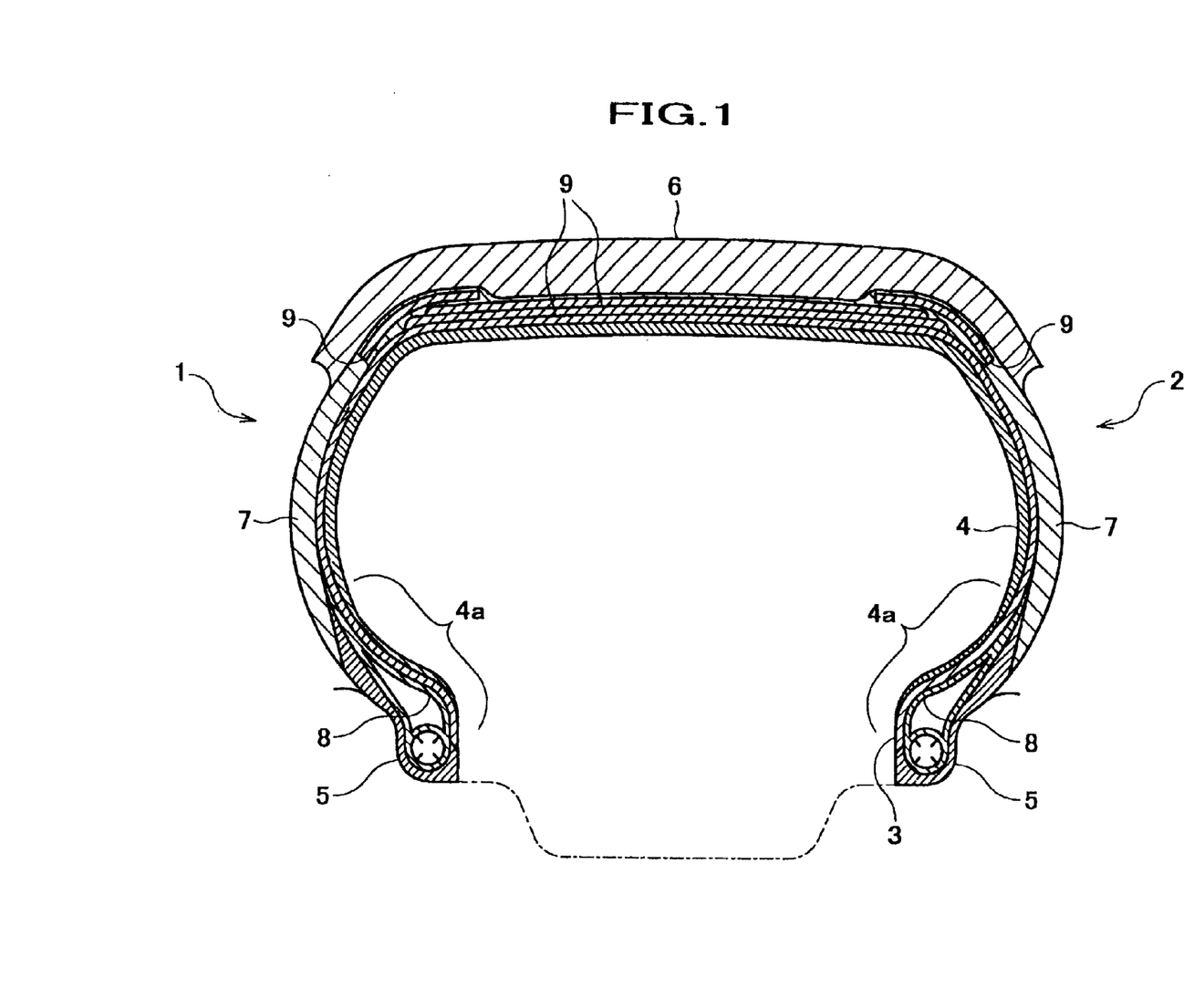
FIG. 1 is a cross sectional view of a tubeless tire of this invention.

This invention will be described in further detail with reference to the accompanying drawings. FIG. 1 is one part of a cross sectional view of a tubeless tire according to the present invention.

The tubeless tire 1 comprises: an outer layer portion 2; and an inner liner layer 3 including rubber or the like, which is stuck on the whole inside of the outer layer portion 2. Furthermore, there is a most inner liner layer 4 provided in an inside of the inner liner layer 3.

The outer layer portion 2 comprises: a bead portion 5, which lets a wheel (as shown with broken line) engage it; a tread portion 6 to be grounding; and a sidewall portion 7, which is a region between the bead portion 5 and the tread potion 6. More further, there is provide a carcass 8 made from fibrous materials in each inside of the bead portion 5, the sidewall portion 7 and the tread portion 6 in order to maintain a form of the tubeless tire. Besides, there are a plurality of belts 9 inserted between the tread portion 6 and the carcass 8 in order to fix a stiffness of the tread portion 6. Still more, there is each of components of the outer layer portion 2 formed in one united body with glued all together by glue or vulcanization mold treatment.

The inner liner layer 3 is made from rubber, which has a role to prevent the tubeless tire 1 from leaking air injected inside thereof out and is stuck on the whole inside of the outer layer portion 2.

most inner layer 4 is made from rubber and the like, and in each of parts 4a, 4a. (as shown in FIG. 1), there is an adhesion part provided, through which the most inner layer 4 is glued on the inner liner layer 3 (as made in a body) by glue or vulcanization mold treatment. At this point, (in FIG. 1), there is non-adhesion part spread in region except for the adhesion part 4a. Therefore, the non-adhesion part of the most inner layer 4 can be transformed independently for the inner liner layer 3 and the outer layer 2.

The most inner layer 4 has a thickness of 0.3 mm 5 mm prepared, and it is made from butyl type rubber, butyl type rubber combined with latex type rubber, styrene-butadiene rubber or natural rubber. In addition, as for a span or a width of the adhesion 4a of the tubeless tire. 1, it is desirable for it to be around 10 mm~50 mm from a bead portion 5.

Besides, in order to increase an anti-air permeability of the most inner layer 4, the resin having a elasticity such as Velaren (a registered trademark of The Yokohama Rubber Co., Ltd.) or the like may be mixed said the inner layer 4 with, or also the fiber such as polyester, polyamide, aramid and the like may be mixed with.

Still more, it is possible that the rubber layer may be laminated with a reinforcement layer made from a combination of said resin and/or said fiber. In addition, as for the direction where the fiber or the fiber layer is displayed, any of direction such as radial direction, lap direction or cross direction will do, and there may be a plurality of fiber layers provided, which are laminated one after another.

Subsequently, as for the condition when a foreign matter such as a nail or the like sticks in a tread portion 6 of the tubeless tire 1 and penetrates both the outer layer portion 2 and the inner liner layer 3 thereof, it will be described referring to FIG. 2.

Figure 2:
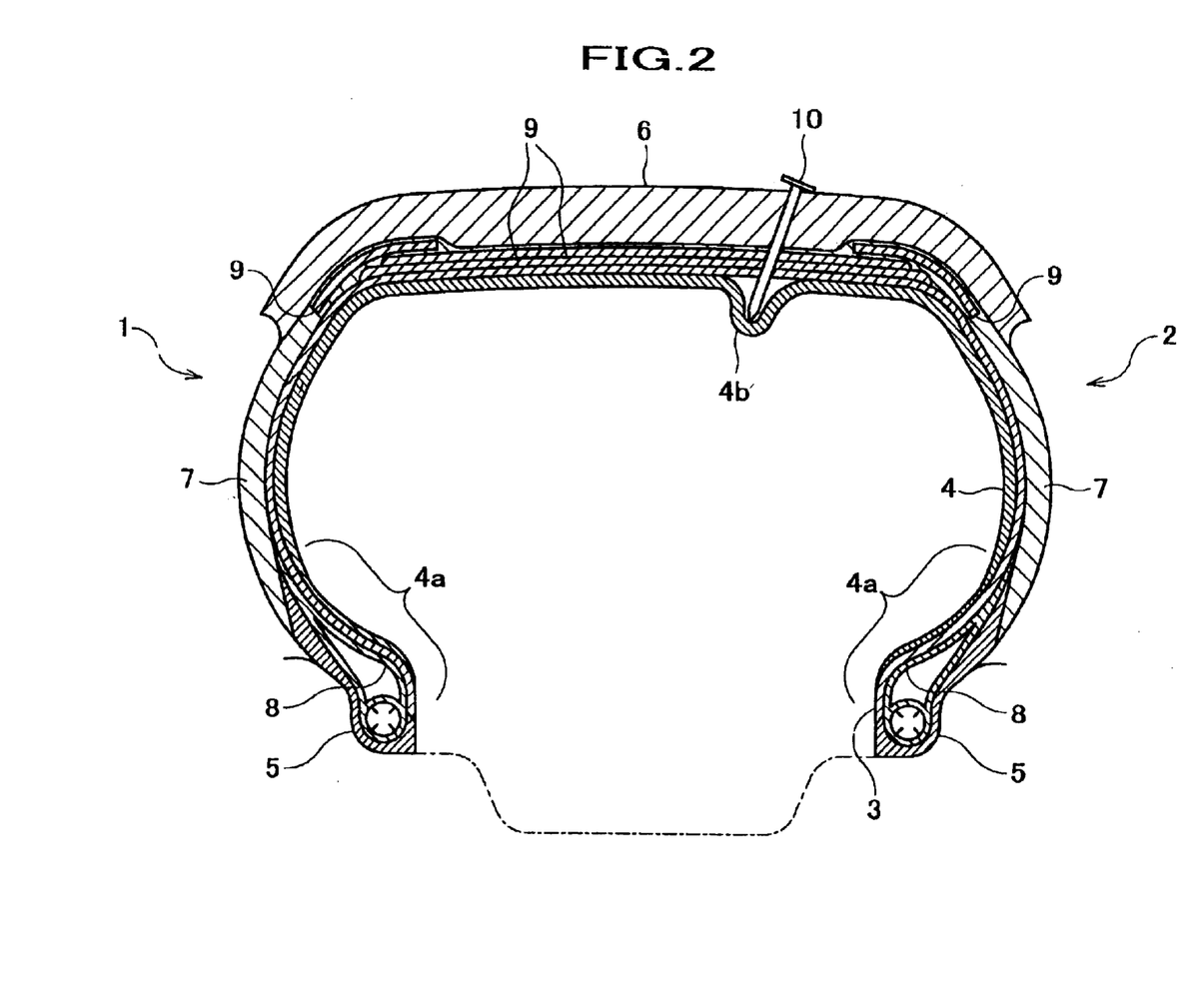
FIG. 2 is a cross sectional view showing the state that a nail has stuck in a tubeless tire of this invention.

As shown FIG. 2, a nail 10 penetrates both the outer layer potion 2 and the inner liner layer 3 but the nail 10 does not penetrate non-adhesion part 4b of the most inner layer 4, because the non-adhesion part 4b of the most inner layer 4 is transformed not only independently for the outer layer portion 2 and the inner liner layer 3, but also for the stress received from the nail 10 to seem to be absorbed Therefore, inside air of the tubeless tire 1 does not leak out.

As for the most inner layer 4, it may be glued to the inner liner layer 3 except for the adhesion part 4a as shown in FIG. 1. For example, as shown in FIGS. 3(a) and (b), there may be respectively liner adhesion parts 11 and dot like adhesion part 12 provided, at which it is glued to the inner liner layer 3. Consequently, as for such an adhesion part 11 or 12, either dot like or liner adhesion thereof does not prevent the most inner layer 4 from transforming and prevent the same from slipping out of predetermined position of the inner liner layer 3 as well.

Besides, a region except for the adhesion parts 11 and 12, which is shown in FIGS. 3(a) and (b), is all non-adhesion part.

Further, as for each line or each point of those adhesion parts 11 or 12, it is desirable for the interval thereof to be 10 mm~150 mm because in case that the interval is smaller than 10 mm, the most inner layer 4 cannot be transformed fully enough to absorb stress to be received from the nail, and in case that the interval is bigger than 150 mm, the non-adhesion part thereof is hardly strange to that of the case that the adhesion parts are only 4a, i.e. there is no adhesion part therein.

Furthermore, to show in FIGS. 4(a) and (b), there can be formed a plurality of folds 15 in the most inner layer 14. In addition to the expansion of the most inner layer 14 itself, by the transform of the folds 15, it becomes possible for bigger stress to be absorbed.

Moreover, in FIGS. 4(a) and (b), as for a part except the folds 15 of the most inner layer 14, it is possible for it to be glued to the inner liner layer 3 through the adhesion part 4a (shown in FIG. 1), the liner adhesion part 11 (shown in FIG. 3(a)) or the dot or point like adhesion part 12 (shown in FIG. 3(b)).

Besides, there may be the folds 15 formed, each wave of which is formed or established at equal spaces as shown in FIG. 4(b) and it may be established in succession not to open an interval. And as for height of the fold 15, it is desirable for it to be 5 mm~50 mm. When it is lower than 5 mm, effect of transformation of a fold is not provided, and when it is higher than 50 mm, it causes the tubeless tire 1 to vibrate or oscillate and leads to vibration of a vehicle.

Furthermore, as for a direction of the folds 15, according to the present invention, it is established in the perpendicular direction to rotatory direction of the tubeless tire 1 as shown in FIG. 4(a), but it can be arranged in arbitrary direction, i.e., parallel or the like to the rotatory direction.

And, in FIG. 4(a), the fold 15 is made for inside of the most inner layer 14; however, it may be established in outside of the most inner layer 14. In this case, it is desirable that there is: a part provided, at which a pointed head of the fold 15 is contacted to the inner liner layer 3, and in which, the fold 15 and the inner liner layer 3 are glued together through the liner adhesion part 11 or the dot like adhesion part 12 formed there.

Second Embodiment

Another embodiment according to the present invention will be described referring to drawings. It should be noted that the reference numeral is used on the same element as in the first embodiment, and the same explanation will be omitted.

Figure 5:
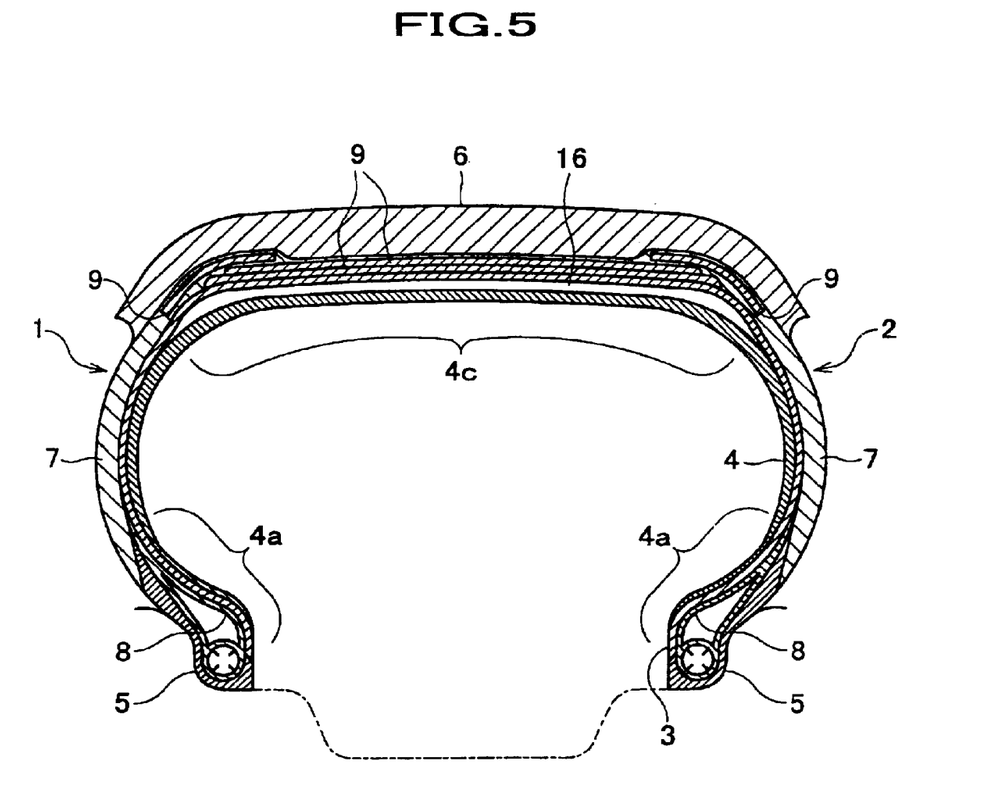
FIG. 5 is a cross sectional view of a tubeless tire having a pneumatic layer between the most inner layer and the inner liner layer.

As shown in FIG. 5, there is the most inner layer 4 of the tubeless tire 1 provided, which non-adhesion part 4c thereof is left only a being fixed distance from the inner liner layer 3 and there is a pneumatic layer 16 between formed. Hereupon, the pneumatic layer 16 has a role to prevent a tensile stress from concentrating on the same part of non-adhesion part 4c to be transformed by nails stuck in the tubeless tire as the non-adhesion part 4b shown in FIG. 2.

As for the non-adhesion part 4b shown in FIG. 2, by difference in pressure between an inside of the tubeless tire 1 and a space formed between the inner liner layer 3 and the non-adhesion part 4b of the most inner layer 4, there is the stress loaded with, which is going to make the space small. Particularly, the tensile stress has concentrated on the point part of the non-adhesion part 4b transformed by the nail 10.

Accordingly, if there is a pneumatic layer 16 as shown in FIG. 5 provided, an inner pressure of which is substantially equal to the inner pressure of the tubeless tire, it is easy to come to prevent a nail from penetrating in the most inner layer 4 more because a stress that is loaded the most inner layer 4c with can be reduced Such pneumatic layer 16 is formed as follows.

First, the non-adhesion part 4c of the most inner layer 4 corresponding to the tread portion 6 is let be separated only fixed distance from the inner liner layer 3.

Subsequently, there is glued the adhesion part 4a on the inner liner layer 3 by vulcanization mold treatment, while air is introduced into the space that appears by the separating.

Further, the most inner layer 4 could hold a change by a heat of the most inner layer 4 in check, when aramid fiber to have a little transformation by a heat is glued thereto. Because the most inner layer 4 glued aramid fiber on has scarcely any transformation by a heat, in comparison that the outer layer portion 2 and inner liner layer 3 are transformed as expanding out by a heat at the time of vulcanization mold treatment, there can be the pneumatic layer 16 provided at the time of vulcanization mold treatment. At this point, it is preferable for aramid fiber to be glued in outside of the most inner layer 4 but it may be glued in inside thereof.

Moreover, there may be formed a plurality of project portions in the pneumatic layer 16 side of the most inner layer 4, which are stuck on the inner liner layer 3, so that the gap with the most inner layer 4 and the inner liner layer 3 can be prevented from occurring.

Third embodiment

Another embodiment according to the present invention will be described referring to drawings. The same reference numeral is used on the same element as in the first embodiment, and the same explanation will be omitted.

Figure 6:
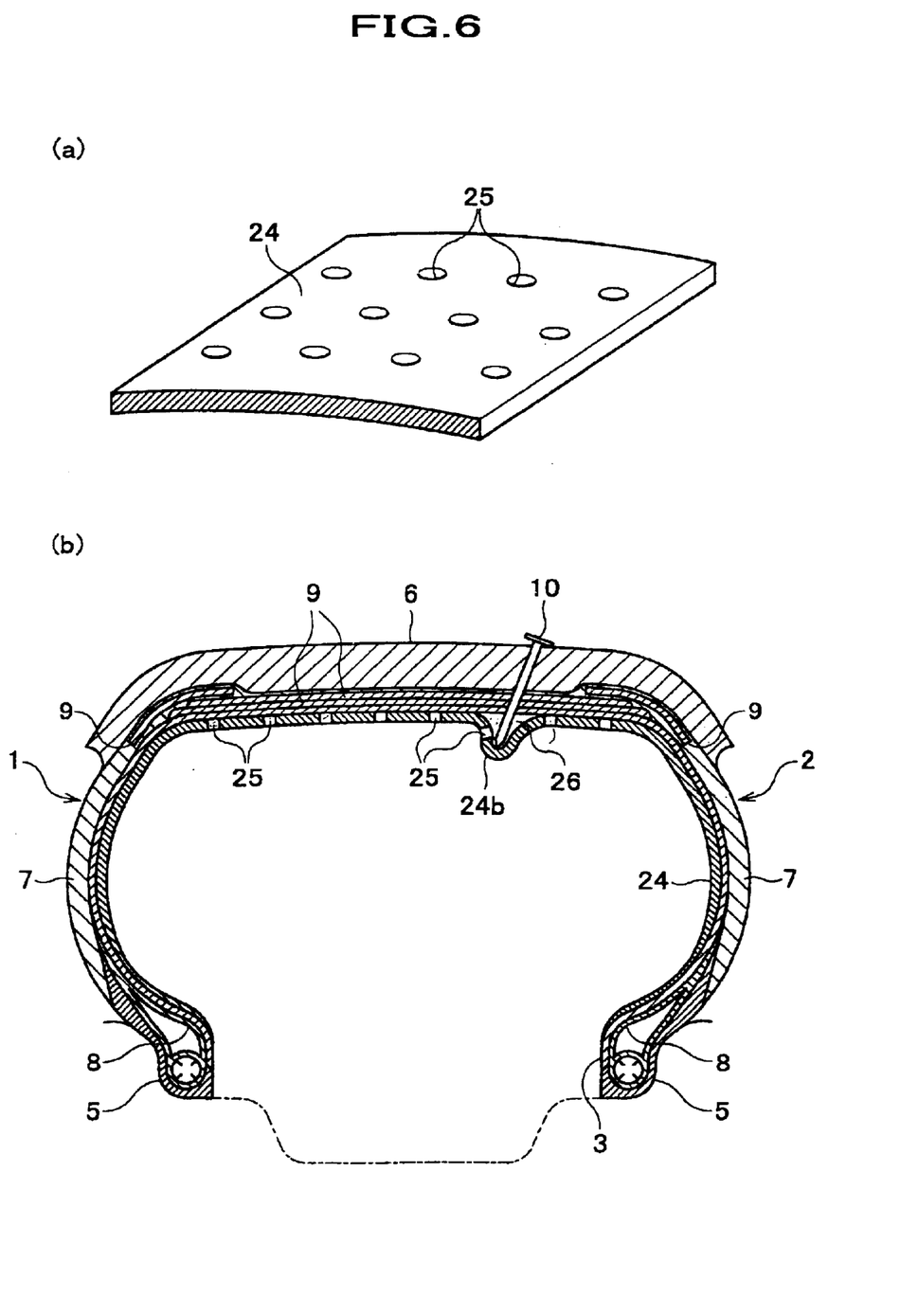
FIG. 6(a) is one part of enlarged view which shows the most inner layer that openings are formed.
FIG. 6(b) is the cross sectional view showing the state that a nail has stuck in the tubeless tire used the most inner layer shown in FIG. 6(a).

As shown in FIGS. 6(a) and (b), as for the tubeless tire of this embodiment, there are formed a plurality of openings 25 stood in line at regular interval in the most inner layer 24 thereof.

When a nail 10 is stuck in the tubeless tire 1, a non-adhesion part 24b of a most inner layer 24 is transformed, and there is a space 26 produced, since air in tubeless tire 1 flows in the space 26 through the opening 25, difference in pressure between the space 26 and an inside of the tubeless tire 1 becomes smaller, so that tensile stress loaded the non-adhesion part 24b with can be reduced Accordingly, the nail 10 can be prevented from penetrating the most inner layer 24.

Hereupon, as for the openings 25, it is desirable for a diameter of a hole thereof to be around 1 mm~2 mm and for each distance of regular interval thereof to be 10 mm~50 mm in order to prevent the nails that stick in the tubeless tire and penetrate the inner liner layer 3 from meeting with the position where the hole of the openings 25 is formed.

Figure 3:
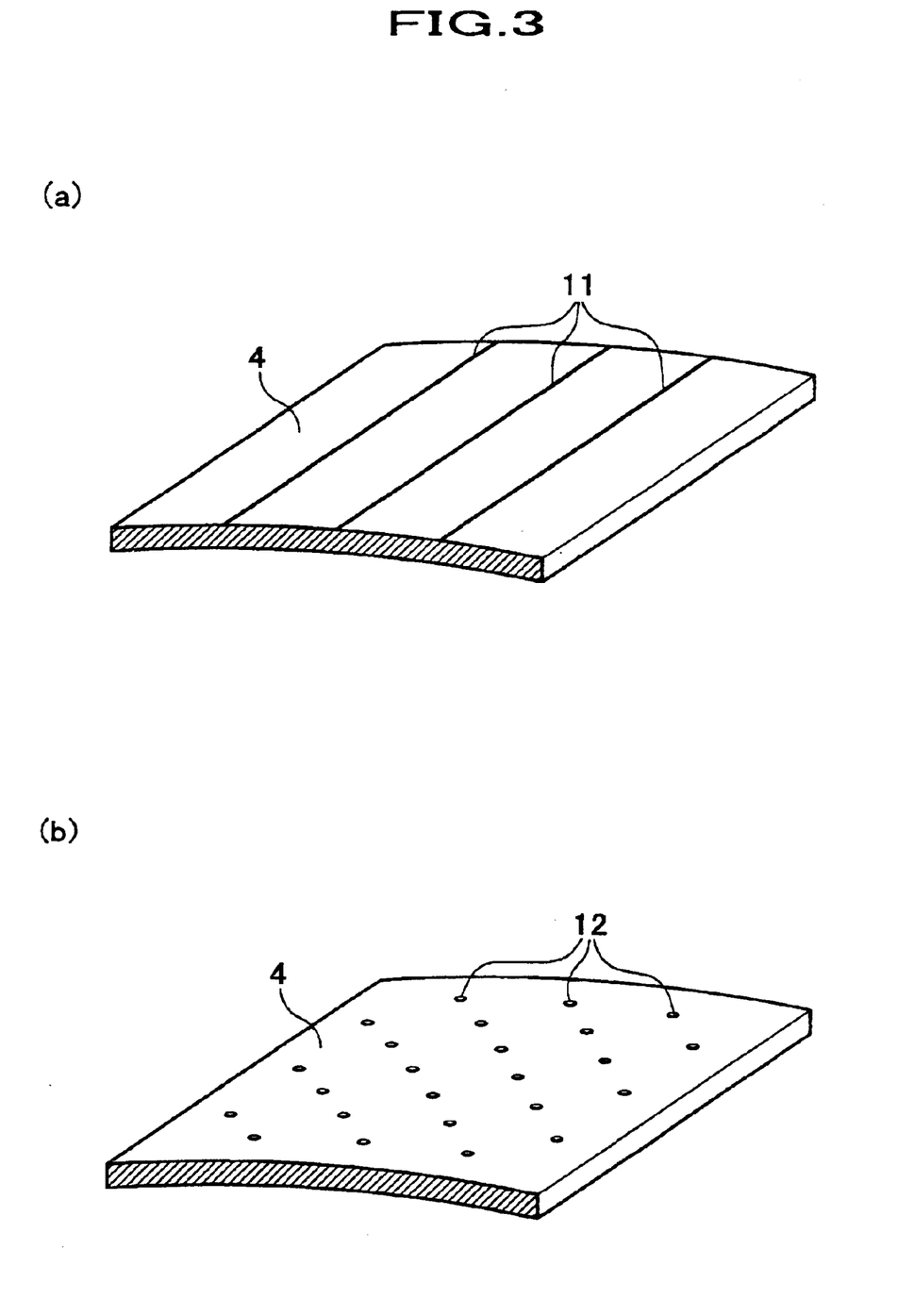
Figure 4:
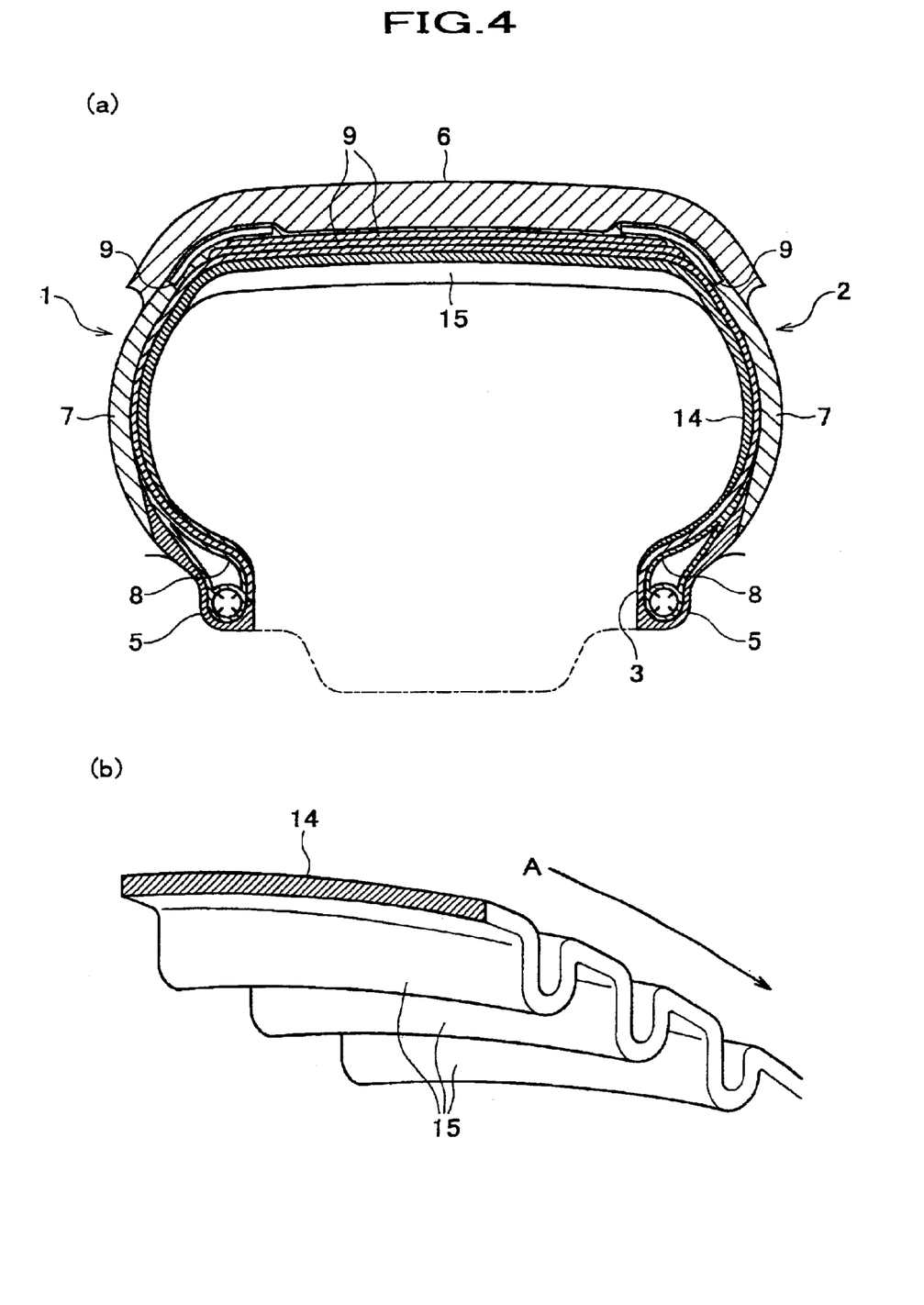
FIG. 4(a) is a cross sectional view of the tubeless tire which made a pleat or a fold for the most inner layer.
FIG. 4(b) is one part of enlarged view of folds.

In addition, it may be possible that a part of the most inner layer 24 where the openings 25 are not formed is glued on the inner liner layer 3 with the liner or the dot like adhesion to show in FIG. 3. Moreover, he fold (as shown in FIG. 4) can be provided on the most inner layer 24.

This invention is not limited to each of embodiments and can be changed and applied in many ways For example, it is established so that the most inner layer 14 to have the fold 15 may form the pneumatic layer and it is possible that above each form is combined each other and adopted.

And the most inner layer 4, 14, 24 are shown to cover the all inside of the inner liner layer 3, but may be formed only to cover a part corresponded to the tread potion 6.

Availability of Application of Industrial Field

According to the present invention, there is the most inner layer formed in inside of the inner liner layer provided, which maintains the airtight of the tubeless tire and is constructed that in the non-adhesion part thereof, it is possible to transform its shape independently for the outer layer portion and the inner liner layer, so that the stress loaded the most inner layer with by the nails can be absorbed in the non-adhesion part of the most inner layer. Therefore, the nails can be prevented from penetrating the most inner layer, and air in the tubeless tire can be prevented from leaking out.

Further, as to the gap of the most inner layer and the inner liner layer, it can be prevented from occurring in running of the tubeless tire, owing to the adhesion part provided, in which the most inner layer is stuck on the inner liner layer. Accordingly, unnecessary vibration dose not occur with the tubeless tire.

Furthermore, even if the big stress is added to the most inner layer, it can be absorbed in a fold established in the most inner layer. Therefore, the nails can be prevented from penetrating the most inner layer.

Still more, due, due to the pneumatic layer formed between the non-adhesion part of the most inner layer and the inner liner layer, and the openings formed at regular interval in the non-adhesion part of the most inner layer, it is possible that the all stress loaded the most inner layer with reduced at the time when the most inner layer is transformed. Accordingly, the nails are prevented from penetrating the most inner layer.

What is claimed is:

1. A tubeless tire comprising twin bead portions, each of which lets a wheel engage it; an outer layer portion having a tread portion to be grounding; and an inner liner layer included rubber, which is entirely stuck inside of the outer layer portion, said tubeless tire comprising:

the most inner layer inside of said inner liner layer, which not only maintains airtight of the tubeless tire, but includes an adhesion part, in which it is stuck to the inner liner layer, and non adhesion part, in which it is not stuck on the inner liner layer and it can be transformed independently for the outer layer portion and the inner liner layer, wherein said most inner layer has a form of pleat.

2. A tubeless tire according to claim 1, wherein a pneumatic layer is formed between said most inner layer and said inner liner layer, in which there is provided a fixed distance between the same layers at one point at least of said non-adhesion part.

3. A tubeless tire comprising twin bead portions, each of which lets a wheel engage it; an outer layer portion having a tread portion to be grounding; and an inner liner layer included rubber, which is entirely stuck inside of the outer layer portion, said tubeless tire comprising:

the most inner layer inside of said inner liner layer, which not only maintains airtight of the tubeless tire, but includes an adhesion part, in which it is stuck to the inner liner layer, and non adhesion part, in which it is not stuck on the inner liner layer and it can be transformed independently for the outer layer portion and the inner liner layer, wherein openings are formed at regular interval in the non adhesion part of said most inner layer.

4. A tubeless tire comprising twin bead portions, each of which lets a wheel engage it;

an outer layer portion having a tread portion for contacting the ground; and an inner liner layer, which is entirely stuck to the inside of the outer layer portion, said tubeless tire including:

a most inner layer inside of said inner liner layer, for maintaining the airtightness of the tubeless tire, the most inner layer having adhesion parts, stuck to the inner liner layer, and a non adhesion part, which is not stuck to the inner liner layer, the non adhesion part being capable of being transformed independently of the outer layer portion and the inner liner layer, wherein said non adhesion part includes at least one additional adhesion part affixed to said inner liner layer to discontinuously bond said non adhesion part to said inner liner layer, wherein the at least one additional adhesion part is provided in a line or dot form, and wherein said most inner layer has a form of pleat.

5. A tubeless tire comprising twin bead portions, each of which lets a wheel engage it;

an outer layer portion having a tread portion to contact the ground; and an inner liner layer, which is entirely stuck to the inside of the outer layer portion, said tubeless tire including:

a most inner layer inside of said inner liner layer, for maintaining the airtightness of the tubeless tire, the most inner layer having adhesion parts which are stuck to the inner liner layer, and a non adhesion part, which is not stuck to the inner liner layer, the non adhesion part being capable of being transformed independently of the outer layer portion and the inner liner layer, wherein said non adhesion part includes at least one additional adhesion part affixed to said inner liner layer to discontinuously bond said non adhesion part to said inner liner layer, and wherein the at least one additional adhesion part is provided in a line or dot form, and wherein openings are formed at regular interval in the non adhesion part of said most inner layer.

* * * * *